F. M. RILLEAU.
QUICKLY DETACHABLE MEANS FOR SECURING TIRES.
APPLICATION FILED SEPT. 10, 1917.
1,260,455.
Patented Mar. 26, 1918.
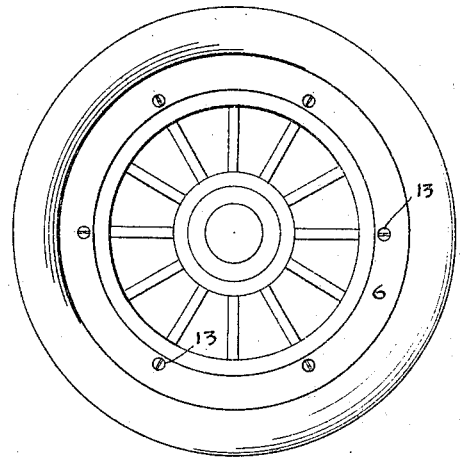
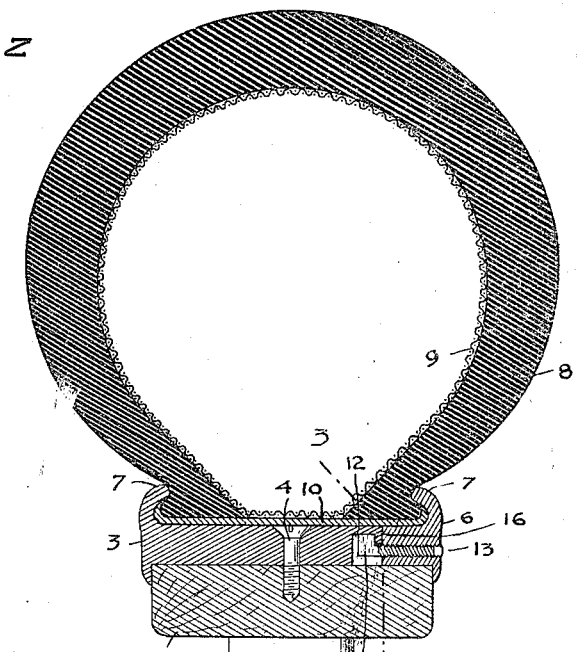
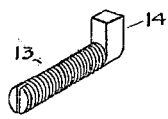
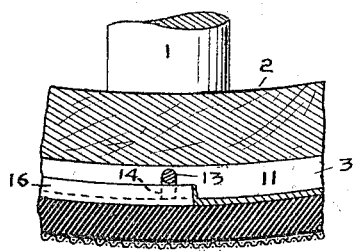
INVENTOR
F. M. RILLEAU
by F. M. Wright,
ATT'Y.

UNITED STATES PATENT OFFICE.

FRANCIS M. RILLEAU, OF SAN FRANCISCO, CALIFORNIA.

QUICKLY-DETACHABLE MEANS FOR SECURING TIRES.

1,260,455.

Specification of Letters Patent. Patented Mar. 26, 1918.

Application filed September 10, 1917. Serial No. 190,541.

*To all whom it may concern:*

Be it known that I, FRANCIS M. RILLEAU, a citizen of France, residing at San Francisco, in the county of San Francisco and State of California, have invented new and useful Improvements in Quickly-Detachable Means for Securing Tires, of which the following is a specification.

The object of the present invention is to provide means whereby a pneumatic tire can be quickly detached from a rim of a wheel, or attached thereto.

In the accompanying drawing, Figure 1 is a side view of a wheel equipped with my invention; Fig. 2 is a cross sectional view of a porton of the wheel showing part of the pneumatic tire; Fig. 3 is a detail section on the line 3—3 of Fig. 2; Fig. 4 is a perspective view in detail.

Referring to the drawing, 1 indicates the spokes, and 2 the felly, of a wheel. The rim around this felly is made in two sections, of which one, 3, is permanently secured to the felly by screws 4, and the other, 6, is removable from the felly. Said sections 3 and 6 are provided with hook portions 7 for securing in place the casing 8 around the inner tube 9. Also around the rim is the usual outer removable rim 10. It is in the means for quickly and easily securing the section 6 to section 3 and detaching it therefrom that my invention resides. For this purpose the section 3 is formed with a circumferentially extending groove or recess 11 having an undercut extension 12. The section 6 is secured to the section 3 by means of screws 13, which may be of any suitable number, six being here shown, each screw having at its inner end a laterally extending lug 14 which is adapted to enter the undercut portion 12 of the groove 11 to hold the section 6 to the section 3.

The screws are screwed into the section 6 from its inner side, the lugs extending at the inner side of the section 6 and at a suitable distance therefrom, dependent upon the thickness of the portion 16 of the section intervening between the undercut extension 12 of the groove 11 and the outside of the section 3. Said lugs are first turned so as to extend in directions substantially parallel with the tangential directions of the portions of the section 6 into which their screws are screwed. They can in this position be easily inserted into the circumferential recess 11 in the section 3. When all six lugs have been so inserted, it is only necessary to turn all, or a sufficient number, of the screws 13, through a quarter of a turn, when the lugs 14 will engage the portions 16 of the section 3 and lock the section 6 thereto. To enable the screws to be screwed into the section 6 from the inside, each screw is formed without a head, and to enable the screws to be turned by a screw driver, they are formed with diametrical slots or recesses in their outer ends, into which the end of the screw driver can be inserted.

It is evident how much more quickly the tire can be removed from the rim than with the ordinary method of securing the tire thereon. For all that is necessary is to turn each screw only a quarter of a turn and the section 6 will be loose from section 3 and can be removed therefrom.

I claim:

1. In combination with a felly of a wheel, a rim section permanently secured thereto and having an undercut groove, a detachable rim section, screws in threaded holes in said detachable rim section and having, at the inner side of said detachable rim section, lugs extending laterally and adapted in one position to engage the undercut portions of said grooves and in another position to be free therefrom.

2. In combination with a felly of a wheel, a rim section permanently secured thereto and having an undercut groove, a detachable rim section, screws in threaded holes in said detachable rim section and having, at the inner side of said detachable rim section, lugs extending laterally and adapted in one position to engage the undercut portions of said grooves and in another position to be free therefrom and having diametrically extending slots in their outer ends to enable them to be turned by a screw driver or the like.

F. M. RILLEAU.